United States Patent [19]
Furukawa et al.

[11] Patent Number: 6,079,863
[45] Date of Patent: Jun. 27, 2000

[54] RESERVATION CONTROL METHOD FOR FACILITIES

[75] Inventors: Junko Furukawa, Ichikawa; Tadashi Miyazaki, Toda, both of Japan

[73] Assignee: Hitachi, Ltd., Tokyo, Japan

[21] Appl. No.: 08/872,997

[22] Filed: Jun. 11, 1997

[30] Foreign Application Priority Data

Jun. 11, 1996 [JP] Japan ..................................... 8-147740

[51] Int. Cl.$^7$ .................................................. G06F 15/00
[52] U.S. Cl. .......................... 364/407; 364/401; 235/381
[58] Field of Search .................................... 235/375, 381; 364/407, 401

[56] References Cited

U.S. PATENT DOCUMENTS

4,788,643 11/1988 Trippe et al. ............................. 364/407
5,404,291 4/1995 Kerr et al. ............................... 364/407

*Primary Examiner*—Harold I. Pitts
*Attorney, Agent, or Firm*—Antonelli, Terry, Stout & Kraus, LLP

[57] ABSTRACT

A reservation control method, system and computer program for reserving times for use of a plurality of facilities. The invention provides for the storing of a time span of dates and times on which each of the facilities are to be used as a reservation schedule in a storage and controlling reservations of the facilities based on the stored reservation schedule. Further the invention provides for setting a time span of dates and times in which use of at least one of the facilities is forbidden as a reservation forbidden schedule in the storage and forbidding reservations for the facilities when the reservations overlap the reservation forbidden schedule. The reservation forbidden schedule can only be accessed and/or modified by a manager of the facility. Reservations for the facility overlapping a reservation schedule approved by the manager are forbidden and a request for reservation which does not overlap the reservation forbidden schedule and a reservation schedule approved by the manager is temporarily stored as a reservation schedule. At a later time the temporarily stored reservation schedule is updated into a status of approval or non-approval in accordance with instructions from the manager.

44 Claims, 5 Drawing Sheets

| DATE | SEGMENT | START TIME | END TIME |
|---|---|---|---|
| 1996/03/19 | 0 | 9:00 | 11:00 |
| 1996/03/21 | 1 | 13:00 | 16:00 |
| ... | . | ... | ... |

| FACILITY ID | USER ID | UTILIZATION OBJECT |
|---|---|---|
| BOARD ROOM NO. 2 | A3278 | CONFERENCE ON STRATEGY |
| RECEPTION ROOM NO. 3 | B0341 | PREVIOUS ARRANGEMENT WITH CLIENTS |
| ... | ... | ... |

FIG. 3

| DATE | DDY = OF WEEK | START TIME | END TIME |
|---|---|---|---|
| 0000/00/00 | 0 | 0:00 | 9:00 |
| 0000/00/00 | 7 | 0:00 | 24:00 |
| 1996/03/20 | 3 | 0:00 | 10:00 |
| ... | . | ... | ... |

| FACILITY ID | USER ID | UTILIZATION OBJECT |
|---|---|---|
| ALL FACILITIES | – | – |
| RECEPTION ROOM NO. 1 | – | – |
| BOARD ROOM NO. 2 | – | – |
| ... | – | – |

| RESERVATION STATE FOR BOARD ROOM NO. 2 | | | | | |
|---|---|---|---|---|---|
| DATE | 3/18 MON | 3/19 TUES | 3/20 WED | ... | 3/24 SUN |
| 9:00 | | | | | |
| 10:00 | | CONFERENCE ON STRATEGY | | | |
| 11:00 | | | | | |
| 19:00 | | | | | |

RESERVATION CONTROL METHOD FOR FACILITIES

BACKGROUND OF THE INVENTION

The present invention relates to a system for controlling an utilization schedule for facilities. More particularly the present invention relates to a method, system and computer program for setting a time span in which utilization of facilities is forbidden and for controlling utilization of the facilities on the basis of the forbidden time span.

A schedule control system for controlling facilities such as a board room, an automobile and a stadium by using an electronic computer is known. For the schedule control system, there are available a system in which on receipt of a request for facility reservation, if the request for reservation overlaps an already registered schedule the request for reservation is rejected, and a system in which the request for reservation which overlaps the already registered schedule is permitted such as the conventional technique disclosed in Japanese Patent Laid-Open Application No. 5-165835. In addition, there are available a system in which on receipt of a request for reservation, it is decided by an electronic computer without the need for any operation of the manager whether the reservation is registered or rejected, and a system in which a schedule, reservation of which has been requested, is once caused to be in a temporarily registered (pending) state to decide approval or non-approval (rejection) by operation of the system manager.

According to the above-described conventional technology, there has been a possibility that when a request for reservation enters at an unexpected or inconvenient time such as, for example, 0:00 at midnight, the schedule control system registers this schedule. Also, with the system which requires the manager's operation, there is a disadvantage that the manager must set, to "non-approval" one by one, each of the reservation schedules which have been temporarily registered at the time span in which the utilization of the facility is forbidden. Also, for facilities users who do not know the forbidden time span of utilization, there has been the inconvenience that they are notified of "non-approval" after a lapse of time after the reservation schedule is temporarily registered.

Further, with the system in which the reservation request which overlaps the already-reserved schedule is rejected, the system cannot distinguish "non-approval" based on the forbidden time span from "non-approval" due to other reasons. Therefore, there has been the problem that all reservation requests which overlap the "non-approval" reservation schedule are rejected so that the facilities cannot be effectively utilized.

SUMMARY OF THE INVENTION

It is an object of the present invention to provide a method, system and computer program which sets a reservation forbidden time span for a facility, and immediately rejects any reservation requests which overlap this reservation forbidden time span thus making it convenient for both the manager of the facility and the user.

It is another object of the present invention to provide a system, method and computer program which does not permit any overlapped reservations for a schedule but requires the manager's operation, for effective utilization of the facility by further rejecting only reservation requests which overlap the approved reservation schedule.

The present invention provides a reservation control method, system and computer program for use by a facility for setting a time span, in which the utilization of the facility is forbidden, as the reservation forbidden schedule and forbidding any reservations which overlap this reservation forbidden schedule.

In addition, the present invention provides a reservation control method, system and computer program for forbidding any reservations for a facility that overlaps the reservation schedule approved by the manager of the facility. Particularly, the present invention provides a reservation control method, system and computer program for reserving times for use of a plurality of facilities. In the present invention a date and time span on which each of the facilities are to be used are stored in a storage as a reservation schedule. Thereafter, reservations of the facilities are controlled based on the reservation schedule stored in the storage.

The present invention further provides that a time span of dates and times in which use of at least one of the facilities is forbidden is set as a reservation forbidden schedule in the storage. Thereafter, reservations for the facilities overlapping the reservation forbidden schedule is forbidden.

In the present invention the reservation forbidden schedule can only be accessed, requested and/or modified by a manager of the facility. However, information concerning the reservation forbidden schedule may be displayed to potential users of the facility.

The present invention further provides that reservations for the facilities overlapping a reservation schedule approved by the manager are forbidden. Further, a request for reservation of the facility which does not overlap the reservation forbidden scheduled and a reservation schedule approved by the manager is temporarily stored as a reservation schedule in the storage. At a later time the temporarily stored reservation schedule may be updated into a status of approval or non-approval in accordance with instructions from the manager.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Hereinafter, the detailed description will be made of an embodiment according to the present invention by using the drawings.

Figure 1:
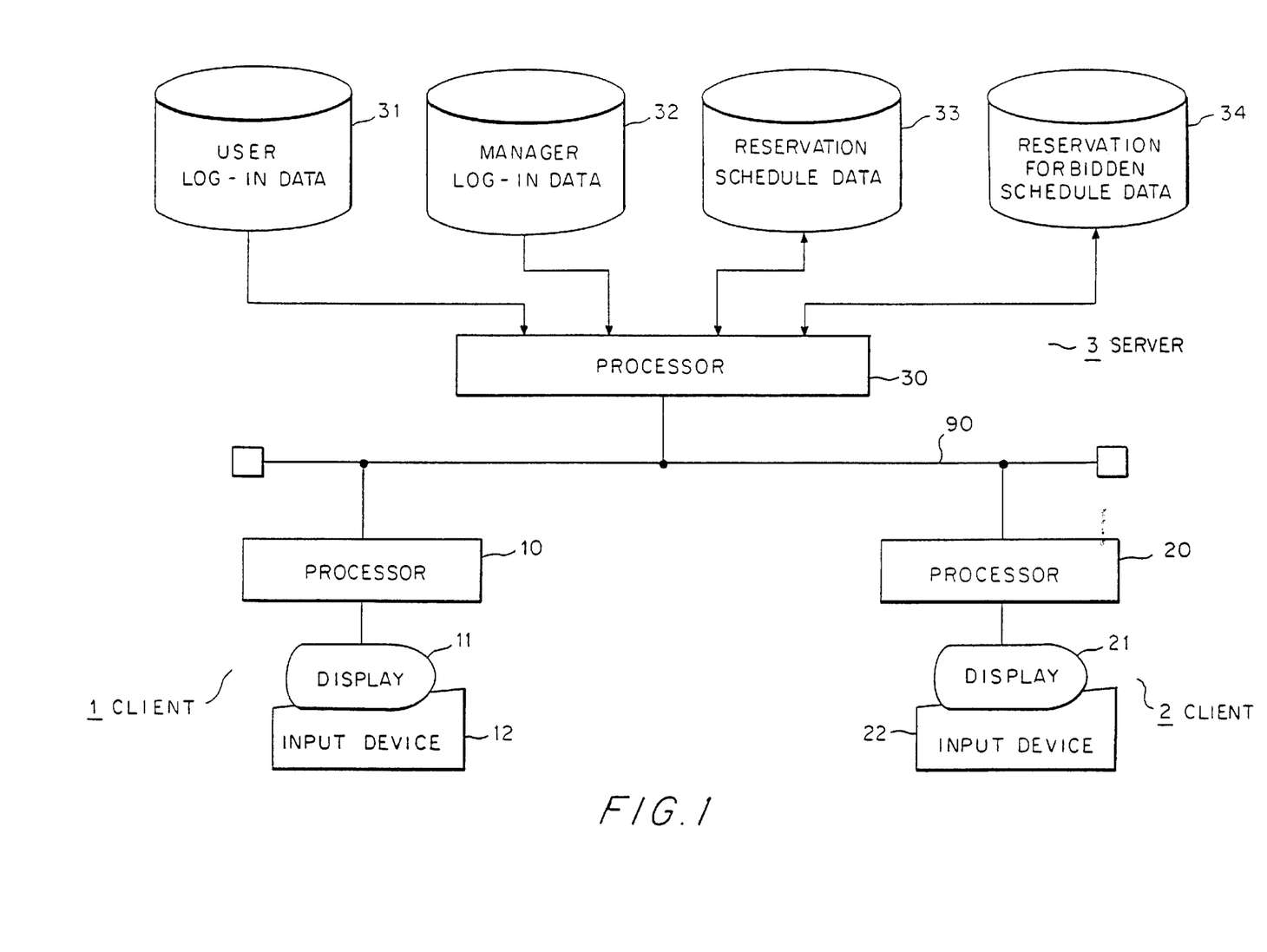
FIG. 1 is a structural view of a reservation system for a facility according to the present invention.

FIG. 1 is a structural view illustrating a facility reservation system according to this embodiment of the present invention. This system is composed of a client 1, a client 2, a server 3 and a network 90 for connecting between the clients 1 and 2, and the server 3. The server 3 is composed of a processor 30 for performing transaction on facility reservation by executing a program stored in a storage (not shown), and user log-in data 31, manager log-in data 32, reservation schedule data data 33 and reservation forbidden schedule 34 which are to be stored in storage media connected to the processor 30.

The user log-in data 31 is a file for storing data on each user such as user identifiers for identifying users of the facility. The manager log-in data 32 is a file for storing data on the manager such as manager identifiers for identifying managers of the facility. The reservation schedule data 33 is a file for storing data concerning the reservation schedule for facility. The reservation forbidden schedule data 34 is a file for registering a time span in which facility reservation is forbidden. The reservation forbidden schedule data 34 can only be accessed and modified by the manager of the facility.

The client 1 is a terminal equipment used by the user of facility. The client 1 terminal equipment includes a processor 10 which inquires the reservation schedule and request for registration by executing the program stored in a storage medium (not shown), a display 11 and an input device 12 which are connected to the processor 10. The display 11 displays the reservation schedule data and reservation forbidden schedule data. The input device 12 inputs a command for inquiring the reservation schedule or registering a facility reservation. The client 2 is a terminal equipment used by the manager of facility. The client 2 terminal equipment includes a processor 20 which requests for approval of the reservation schedule and registration of the reservation forbidden schedule and requests for registration by executing a program stored in a storage (not shown), a display 21 connected to the processor 20 and an input device 22. Access, registration and/or modification of the reservation forbidden schedule can only be performed by the manager. The display 21 displays the reservation schedule data of the facility and the reservation forbidden schedule data. The input device 22 inputs a command for inquiring of the reservation schedule or registering the reservation forbidden schedule. The client 1, client 2 and server 3 can be implemented by an information processing device including personal computers and work stations which operate using operating systems such as UNIX, Windows NT, Claris, etc.

When there are inputted a command and data for registering a reservation forbidden schedule from the input device 22 of the client 2 after the manager log-in, the processor 20 transmits a request for registration of the reservation forbidden schedule and the data to the server 3 through a network 90. The processor 30 for the server 3 stores the reservation forbidden schedule data received in the reservation forbidden schedule data 34.

When a command for inquiring the reservation schedule from the input device 12 of client 1 has been inputted after the user log-in, the processor 10 transmits a request for inquiry of the reservation schedule to the server 3 through the network 90. The processor 30 of the server 3 refers to the reservation schedule data 33 and reservation forbidden schedule data 34 to fetch the reservation schedule and reservation forbidden schedule of a designated date, and sorts both according to start time to transmit to the client 1 through the network 90. The processor 10 displays the reservation schedule and reservation forbidden schedule received on the display 11.

When a command and data for registering the reservation schedule are inputted from the input device 12 of the client 1, the processor 10 transmits a registration request of the reservation schedule to the server 3. If at the designated date and time span, forbidden reservation is not registered in the reservation forbidden schedule data 34, or it is not registered as an approved reservation in the reservation schedule data 33, temporary registration is performed in the reservation schedule data 33. When a command and data for approving the reservation schedule are inputted from the input device 22 of the client 2, the processor 20 transmits a request to update the reservation schedule to the server 3. The processor 30 fetches the reservation schedule on the designated date by referring to the reservation schedule data 33 to transmit it to the client 2. The processor 20 displays the reservation schedule data received on the display 21. When information of approval or non-approval of the schedule is inputted from the input device 22, the processor 20 transmits this information to the server 3. The processor 30 sets approval or non-approval to the schedule designated on the reservation schedule data 33.

Figure 2:
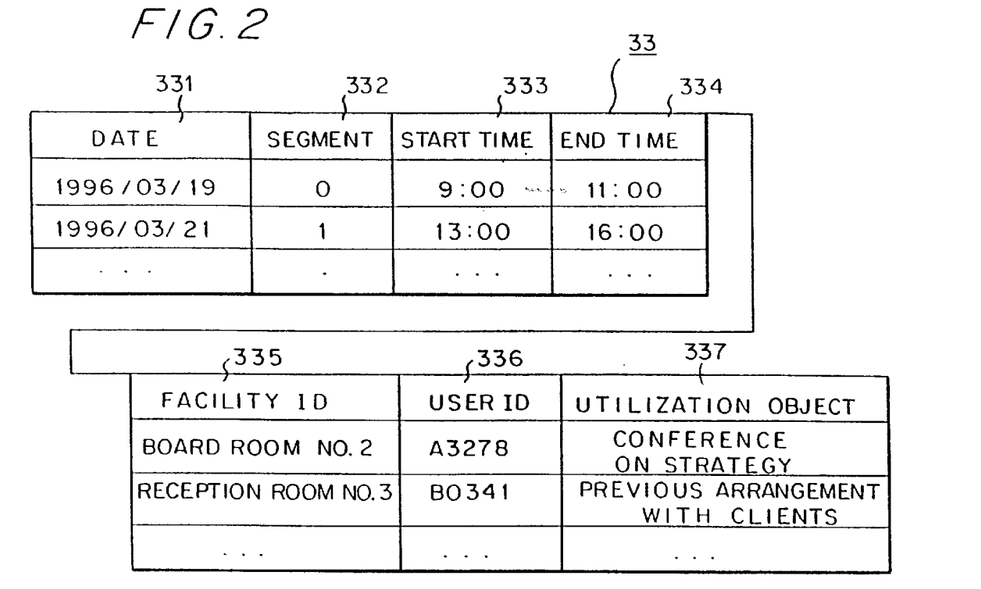
FIG. 2 is a view illustrating the data format of reservation schedule data according to the present invention.

FIG. 2 is a view illustrating an example of the data format of the reservation schedule data 33. One record is composed of data items such as a date 331, segment 332, start time 333, end time 334, facility ID 335, user ID 336 and utilization objects 337. The date 331 is a reservation date for facility. In the segment 332, 0, 1 or 2 are stored, and 0 represents a pending reservation, 1 represents an approved reservation and 2 represents a rejected reservation (non-approval). The facility ID 335 represents a facility identifier, user ID 336 represents a user's identifier, and utilization object 337 is a brief description of the utilization object of the facility.

Figure 3:
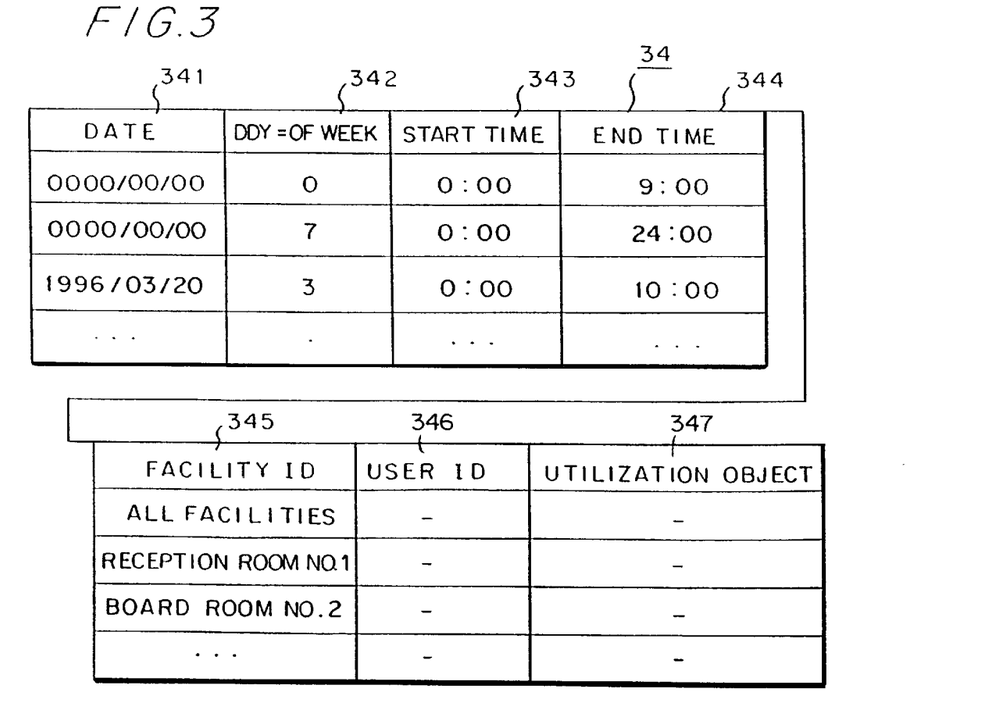
FIG. 3 is a view illustrating the data format of reservation forbidden schedule data according to the present invention.

FIG. 3 is a view illustrating an example of the data format of the reservation forbidden schedule data 34. The format and length of one record are the same as the record of reservation schedule data 33. The date 341 denotes a date on which the reservation of the facility is forbidden. The date 341 of 0000/00/00 denotes that no specified date is restricted. Day-of-week 342 is a code indicative of a day of the week, wherein codes 1, 2, . . . 7 denote Monday, Tuesday, . . . Sunday respectively. The code 0 of the day-of-week 342 denotes that a specified day of the week is not limited. The time span for forbidden reservation is set by the start time 343 and the end time 344. The facility ID 345 is a facility identifier, and the user ID 346 and the utilization object 347 are always represented by space. According to the example shown in FIG. 3, for a time span between time 0:00 and time 9:00, reservations for all facilities are always forbidden. In addition, the reservation for reception room No. 1 is forbidden all day long on Sundays.

When log-in formation such as a manager ID and a password is inputted from the input device 22 by the manager, the processor 20 transmits this log-in information to the server 3. Referring to the manager log-in data 32, the processor 30 checks whether or not the manager ID, etc. coincide with those registered therein, and if in the affirmative, accepts the manager's request. When a command and data for registering a reservation forbidden schedule are inputted from the input device 22 from a manager whose request has been accepted, the processor 20 transmits the request and data to register the reservation forbidden schedule data to the server 3. The processor 30 registers the reservation forbidden schedule data received in the reservation forbidden schedule data 34.

Figure 4:
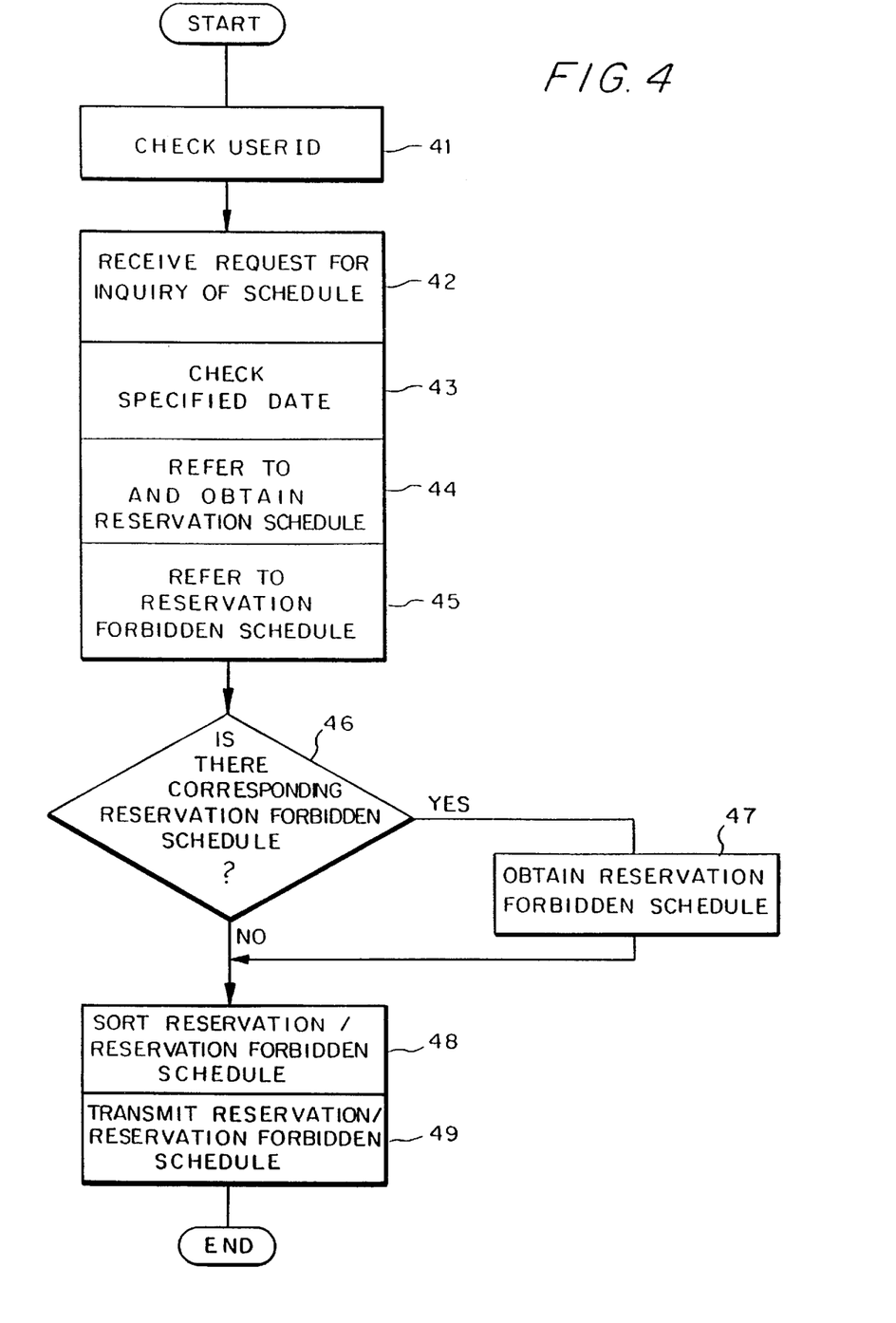
FIG. 4 is a flow chart illustrating a flow of processing by a server which inquires of the reservation schedule according to the present invention.

FIG. 4 is a flowchart illustrating a flow of processing by the processor 30 of the server 3 on receipt of a request for inquiry about the reservation schedule from client 1. First, the processor 30 receives a log-in request from the client 1, and checks the user ID entered by the user by referring to the user log-in data 31 (Step 41). If the user ID has been registered, the processor 30 receives a request to inquire of a reservation schedule with the date and facility ID designated from the client 1 (Step 42). Thereafter, the processor 30 checks whether or not the designated date is a date on the calendar (Step 43). For the date, a period consisting of plural, continuous dates may be designated. If the date is correct, the reservation schedule data 33 is retrieved according to the date 331 and the facility ID 335 to obtain the corresponding reservation schedule data (Step 44).

Next, referring to the reservation forbidden schedule data 34 (Step 45). The processor 30 determines whether or not there is a reservation forbidden schedule relating to the specified date for the facility ID designated (Step 46). The processor 30 first refers to the date 341, and determines whether or not there is a reservation forbidden schedule corresponding to the specified date. Then, the processor 30 refers to the date 341 and day-of-week 342, and determines whether or not there is any reservation forbidden schedule on the day of the week of the specified date irrespective of the date. Then, the processor 30 refers to the date 341 and the day-of-week 342 to determine whether or not there is any daily reservation forbidden schedule irrespective of the date and day-of-week.

If there is a corresponding reservation forbidden schedule (YES in Step 46), the reservation forbidden schedule data is retrieved (Step 47). Next, the processor 30 sorts the reservation schedule data and reservation forbidden schedule data thus obtained by the dates 331 and 341 and the start time 333 and 343 (Step 48) to transmit to the client 1 (Step 49). On receipt of these sorted reservation schedule data and reservation forbidden schedule data, the processor 10 edits them into a display format of a schedule chart which is displayed on the display 11.

Figure 5:
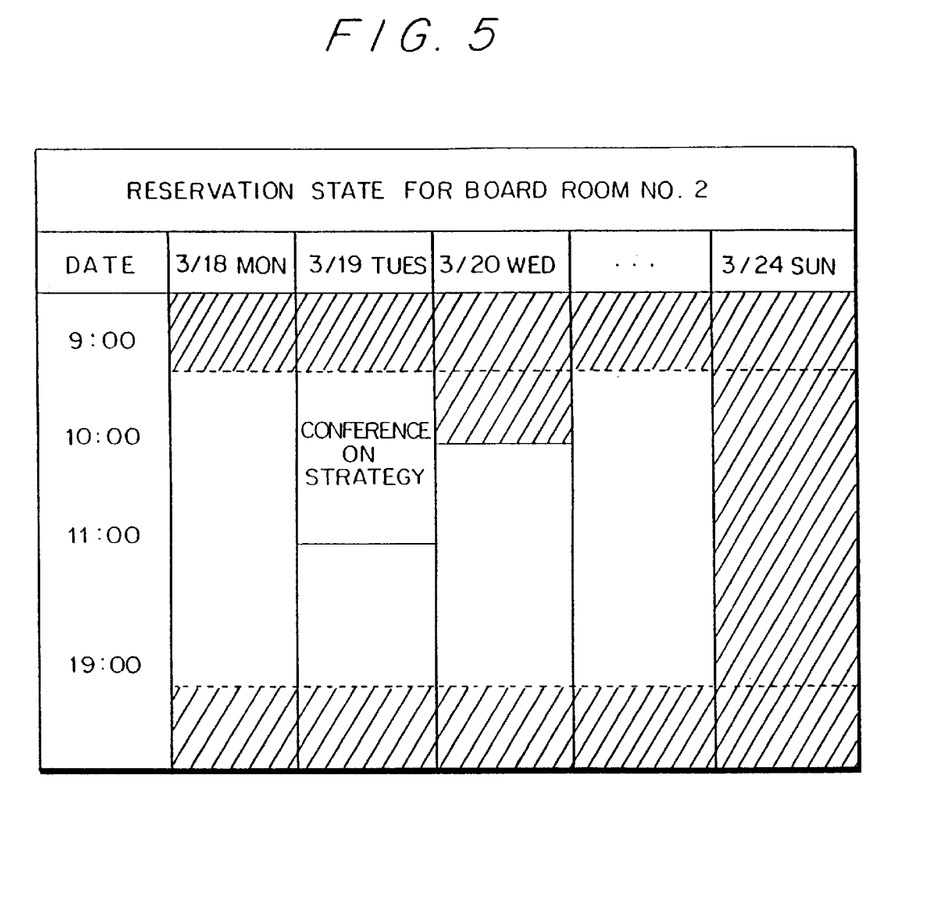
FIG. 5 is a view illustrating an example of the schedule chart displayed on a display.

FIG. 5 is a view illustrating an example of the schedule chart displayed on the display 11. The hatched portions in the figure indicate time spans for the reservations forbidden schedule.

Figure 6:
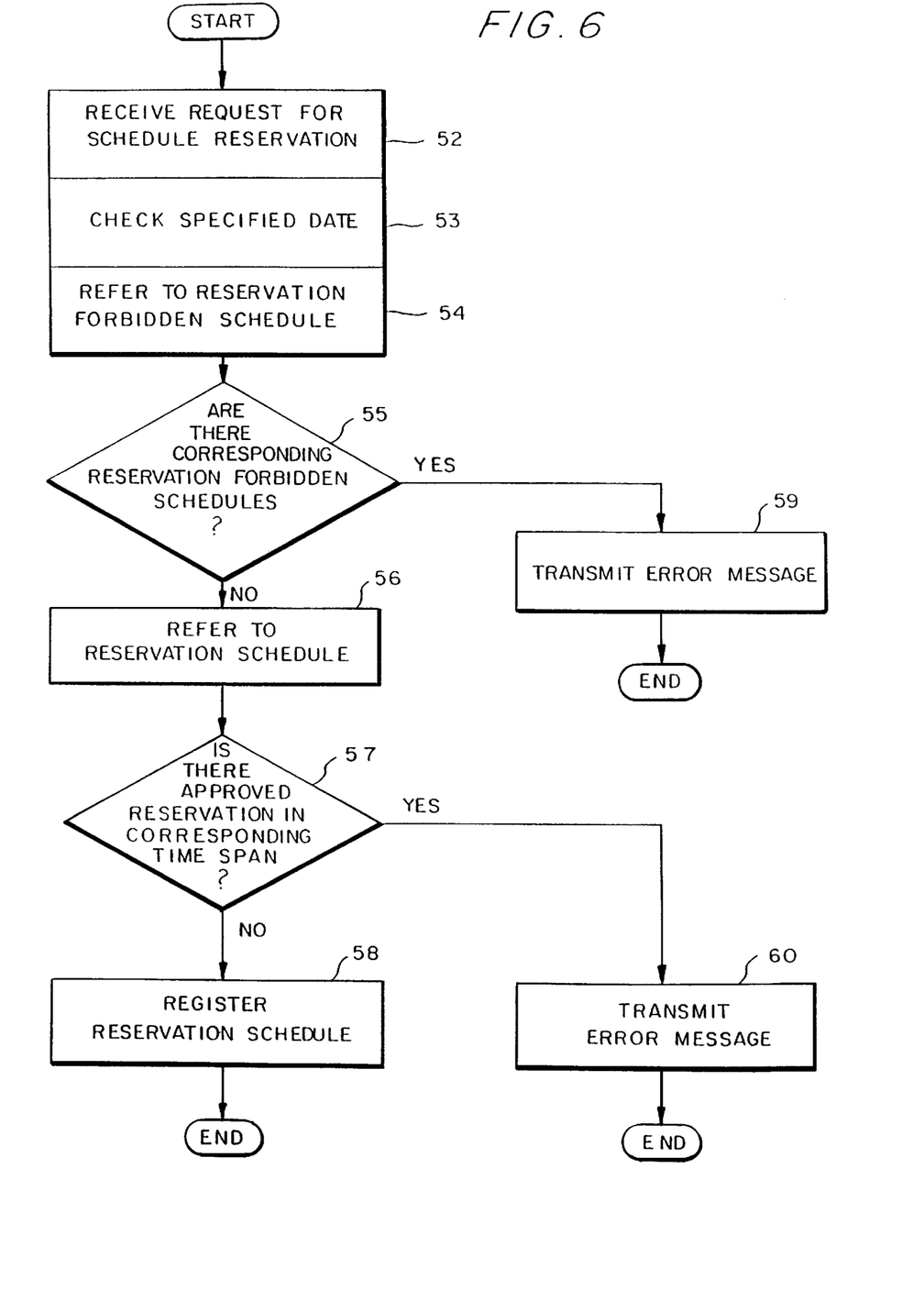
FIG. 6 is a flow chart illustrating a flow of processing by the server which reserves a schedule according to the present invention.

FIG. 6 is a flowchart illustrating a flow of processing by the processor 30 on receipt of a request for a reservation schedule from the client 1. After checking on the user ID at the request of log-in, the processor 30 receives a request for reservation of a schedule with the date, time span, facility ID and utilization object designated from the client 1 (Step 52) to check whether or not the specified date is a date on the calendar (Step 53). If the date is correct, the processor 30 retrieves the reservation forbidden schedule data 34 according to the date 341, day-of-week 342, start time 343, end time 344 and facility ID 345 (Step 54), and determines whether or not there is a reservation forbidden schedule on the specified date and time span for the facility ID designated (Step 55).

A reservation forbidden schedule overlapping the specified time span on the designated date, a reservation forbidden schedule overlapping the specified time span on the same day of the week as the designated date, or a reservation forbidden schedule overlapping daily specified time span are all corresponding reservation forbidden schedules. If there is no corresponding reservation forbidden schedule (NO in Step 55), the processor 30 retrieves the reservation schedule data 33 according to the date 331, start time 333, end time 334 and facility ID 335 (Step 56) to determine whether or not a segment 332 overlapping the specified date and time span for the designated facility ID has a reservation of 1 (approved) (Step 57). If there is no approved reservation at the corresponding time span (NO in Step 57), the processor 30 prepares a record for reservation schedule from the received data to register in the reservation schedule data 33 (Step 58). At this time, the processor 30 sets the segment 332 to 0 (pending). However if the processor 30 determines that there is a reservation forbidden schedule at the corresponding time span (YES in Step 55), an error message is transmitted to client 1 (Step 59) indicating that the request for reservation schedule can not be satisfied. Similarly, if the processor 30 determines that there are no corresponding reservation forbidden schedules (NO in Step 55) and that there is an approved reservation (YES in Step 57), an error message is transmitted to the client 1 (Step 60) indicating that the request for reservation schedule can not be satisfied.

On receipt of a request to update the reservation schedule with the facility ID designated from the client 2 after the log-in, the processor 30 retrieves the reservation schedule data 33 according to the facility ID 335 to extract all the corresponding reservation schedules. Next, the processor 30 sorts the records for reservation schedule extracted according to the date 331 and start time 333 to transmit to the client 2. The processor 20 of the client 2 displays the reservation schedule received on the display 21. When it is instructed to update, from 0 (pending) to 1 (approval) or 2 (non-approval), the segment 332 in the record for reservation schedule through the input device 22, the processor 20 transmits the updated reservation schedule to the server 3 in accordance with the command from the input device 22. The server 3 retrieves the reservation schedule data 33 with the date 331, start time 333, end time 334 and facility ID 335 as the key to update the segment 332 from 0 (pending) to 1 (approval) or 2 (non-approval). Finally, it notifies the user indicated in the user ID 336 of the result (approval or non-approval) of temporary registration of the reservation.

According to the above-described embodiment, the reservation schedule approved has the same effect as the reservation forbidden schedule so that it can exclude a request for reservation of other schedules overlapping the time span for the same facility. When, however, there is permitted a reservation overlapping the time span for the same facility without the need for any operation of the manager, the Step 57, Step 60 and the approval operation of the reservation schedule by the manager may be omitted. When the reservation is approved, the server 3 permits temporary registration of a request for the reservation overlapping the reservation schedule of "non-approval" or "pending" until the reservation schedule is approved, and is to reject all requests for reservations overlapping it after the reservation is approved.

According to the present invention, since requests for reservation overlapping the reservation forbidden schedule data are automatically excluded, it can save the facility manager's time, and notify the facility user quickly. In addition, since the conventional "non-approval" has been divided into forbidden reservation based on the reservation forbidden schedule and exclusion of requests for reservation due to reasons other than it, there arises a possibility that a request for reservation overlapping the reservation schedule of "non-approval", which is called in the present invention, is accepted, thereby enabling effective utilization of the facility to be performed.

The flowcharts illustrated in FIGS. 4 and 6 represent sections of code of a computer program being executed by the processor 30 of the server 3. The computer program can be written in any language and is operable using operating systems such as UNIX, Windows NT, Claris and the like. The computer program may be embodied on a storage medium such as a floppy disk, CD, programmable ROM or the like for use in any server having a processor and usable storage such as the server 3 illustrated in FIG. 1. The computer program may also be stored in a storage medium included in a server connected to a network, wherein the computer program can be transferred from the server to other computer servers or the like connected to the network. The computer program may also be stored in main memory accessible for execution by the processor 30 of the server 3.

The computer program which implements the reservation control of the present invention including the computer programs represented by FIGS. 4 and 6 may also be provided as part of a "groupware" package of software such as Groupmax, Scheduler, etc. which includes schedule, mail and workflow functions. Such groupware can be provided on a network including a server, local area network (LAN) and a plurality of computers/work stations connected to the LAN.

Both the client and server functions may be installed at either the client or the server. Such flexibility in the installation of the client and server functions may be needed for example depending upon the processing power of the server apparatus or the client apparatus.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A reservation control method for reserving times for use of a plurality of facilities, comprising the steps of:

storing a date and a time span on which each of said facilities are to be used as a reservation schedule;

controlling reservations of said facilities based on said reservation schedule;

setting a time schedule, in which use of at least one of said facilities is forbidden, as a reservation forbidden schedule; and forbidding reservations for said facilities where said reservations overlap said reservation forbidden schedule.

2. A reservation control method according to claim 1, further comprising the step of:

forbidding reservations for said facilities where said reservations overlap a reservation schedule approved by a manager.

3. A reservation control method according to claim 2, further comprising the steps of:

temporarily storing a request for reservation, which does not overlap said reservation forbidden schedule and a reservation schedule approved by said manager, as a reservation schedule; and updating the temporarily stored reservation schedule with a status of approval or non-approval in accordance with instructions from said manager.

4. A reservation control method according to claim 1, further comprising the step of:

displaying said reservation forbidden schedule for viewing by users of said facilities prior to making reservations.

5. A reservation control method according to claim 1, wherein said reservation forbidden schedule can only be accessed, set and/or modified by a manager of said facilities.

6. A reservation control method according to claim 1, further comprising the steps of:

storing user log-in data which includes user identifiers each identifying a user permitted to use said facilities;

requiring a user to enter a user identifier prior to entering a reservation;

comparing the entered user identifier with said user login data; and permitting said user to enter a reservation when the entered user identifier matches one of said user identifiers included in said user log-in data.

7. A reservation control method according to claim 1, further comprising the steps of:

storing manager log-in data which includes manager identifiers each identifying a manager permitted to approve reservations or access and modify said reservation forbidden schedule;

requiring said manager to enter a manager identifier prior to approving reservations or accessing and modifying said reservation forbidden schedule; and permitting said manager to approve reservations or to access and modify said reservation forbidden schedule when the entered manager identifier matches one of said manager identifiers included in said manager log-in data.

8. A reservation control computer program stored in a storage medium for reserving times for use of a plurality of facilities, said computer program when executed by a computer causes said computer to perform the steps of:

storing a date and a time span on which each of said facilities are to be used as a reservation schedule;

controlling reservations of said facilities based on said reservation schedule;

setting a time schedule, in which use of at least one of said facilities is forbidden, as a reservation forbidden schedule; and forbidding reservations for said facilities where said reservations overlap said reservation forbidden schedule.

9. A reservation control computer program according to claim 8, when executed by said computer causes said computer to perform the further step of:

forbidding reservations for said facilities where said reservations overlap a reservation schedule approved by a manager.

10. A reservation control computer program according to claim 9, when executed by said computer causes said computer to perform the further steps of:

temporarily storing a request for reservation, which does not overlap said reservation forbidden schedule and a reservation schedule approved by said manager, as a reservation schedule; and updating the temporarily stored reservation schedule with a status of approval or non-approval in accordance with instructions from said manager.

11. A reservation control computer program according to claim 8, when executed by said computer causes said computer to perform the further step of:

displaying said reservation forbidden schedule for viewing by users of said facilities prior to making reservations.

12. A reservation control computer program according to claim 8, wherein said reservation forbidden schedule can only be accessed, set and/or modified by a manager of said facilities.

13. A reservation control computer program according to claim 8, when executed by said computer causes said computer to perform the further steps of:

storing user log-in data which includes user identifiers each identifying a user permitted to use said facilities;

requiring a user to enter a user identifier prior to entering a reservation;

comparing the entered user identifier with said user login data; and permitting said user to enter a reservation when the entered user identifier matches one of said user identifiers included in said user log-in data.

14. A reservation control computer program according to claim 8, when executed by said computer causes said computer to perform the further steps of:

storing manager log-in data which includes manager identifiers each identifying a manager permitted to approve reservations or access and modify said reservation forbidden schedule;

requiring said manager to enter a manager identifier prior to approving reservations or accessing and modifying said reservation forbidden schedule; and permitting said manager to approve reservations or to access and modify said reservation forbidden schedule when the entered manager identifier matches one of said manager identifiers included in said manager log-in data.

15. A reservation control computer program according to claim 8, wherein said storage medium is included in a server connected to a network having a plurality of computers; and wherein said server transfers said reservation control computer program to said computer for execution, via said network.

16. A reservation control computer program according to claim 8, wherein said computer which executes said reservation control computer program is a server computer.

17. A reservation control computer program according to claim 8, wherein said computer which executes said reservation control computer program is a client computer.

18. A reservation control system for reserving times for use of a plurality of facilities, comprising:

a storage which stores a date and a time span on which each of said facilities are to be used as a reservation schedule and a time schedule in which use of at least one of said facilities is forbidden as a reservation forbidden schedule; and a processor which controls reservations of said facilities based on said reservation schedule, sets a time schedule, in which use of at least one of said facilities is forbidden, as said reservation forbidden schedule, and forbids reservations for said facilities where said reservations overlap said reservation for bidden schedule.

19. A reservation control system according to claim 18, wherein said processor forbids reservations for said facilities where said reservations overlap a reservation schedule approved by a manager.

20. A reservation control system according to claim 19, wherein said processor temporarily stores in said storage a request for reservation, which does not overlap said reservation forbidden schedule and a reservation schedule approved by said manager, as a reservation schedule, and updates the temporarily stored reservation schedule with a status of approval or non-approval in accordance with instructions from said manager.

21. A reservation control system according to claim 18, wherein said processor displays on a display screen said reservation forbidden schedule for viewing by users of said facilities prior to making reservations.

22. A reservation control system according to claim 18, wherein said reservation forbidden schedule can only be accessed, set and/or modified by a manager of said facilities.

23. A reservation control system according to claim 18, wherein said storage stores user log-in data which includes user identifiers each identifying a user permitted to use said facilities; and wherein said processor requires a user to enter a user identifier prior to entering a reservation, compares the entered user identifier with said user log-in data, and permits said user to enter a reservation when the entered user identifier matches one of said user identifiers included in said user log-in data.

24. A reservation control system according to claim 18, wherein said storage stores manager log-in data which includes manager identifiers each identifying a manager permitted to approve reservations or access and modify said reservation forbidden schedule; and wherein said processor requires said manager to enter a manager identifier prior to approving reservations or accessing and modifying said reservation forbidden schedule, and permits said manager to approve reservations or to access and modify said reservation forbidden schedule when the entered manager identifier matches one of said manager identifiers included in said manager log-in data.

25. A reservation control method for reserving times for use of a plurality of facilities, comprising the steps of:

receiving a log-in request from a user of said facilities, said log-in request including a user ID;

permitting said user to enter a request for reservation of a facility if said user ID matches one of a plurality of user ID's included in user log-in data, said request for reservation including a date designated by said user;

retrieving reservation schedule data corresponding to said date designated by said user;

retrieving reservation forbidden schedule data corresponding to said date designated by said user if said date designated by said user corresponds to a time schedule in said reservation forbidden schedule data; and displaying said reservation schedule data and said reservation forbidden schedule data corresponding to said date designated by said user for viewing by said user when said date designated by said user corresponds to said time schedule of said reservation forbidden schedule data.

26. A reservation control method according to claim 25, wherein said request for reservation further includes a facility ID identifying said facility; and wherein said retrieving reservation schedule data step retrieves said reservation schedule data corresponding to said date designated by said user and said facility ID.

27. A reservation control method according to claim 26, wherein said retrieving reservation forbidden schedule data step retrieves said reservation forbidden schedule data corresponding to said date designated by said user and said facility ID if said date designated by said user corresponds to said time schedule in said reservation forbidden schedule data and said facility ID corresponds to a facility related to said time schedule in said reservation forbidden schedule data.

28. A reservation control method according to claim 25, wherein said displaying step comprises the step of:

displaying said reservation forbidden schedule data in a manner which distinguishes said reservation forbidden schedule data from said reservation schedule data.

29. A reservation control method for reserving times for use of a plurality of facilities, comprising the steps of:

receiving a log-in request from a user of said facilities, said log-in request including a user ID;

permitting said user to enter a request for reservation schedule of a facility if said user ID matches one of a plurality of user ID's included in user log-in data, said request for reservation including a date designated by said user;

retrieving reservation forbidden schedule data corresponding to said date designated by said user when said date designated by said user corresponds to a time schedule in said reservation forbidden schedule data;

outputting an error message indicating that said request for reservation can not be satisfied when said date designated by said user corresponds to said time schedule in said reservation forbidden schedule data;

retrieving reservation schedule data corresponding to said date designated by said user when said date designated by said user does not correspond to said time schedule in said reservation forbidden schedule data;

outputting an error message indicating that said request for reservation can not be satisfied when said date designated by said user corresponds to said time schedule of an approved reservation schedule in said reservation schedule data; and registering a reservation schedule corresponding to said request for reservation when said date designated by said user does not correspond to said time schedule of an approved reservation schedule in said reservation schedule data.

30. A reservation control method according to claim 29, wherein said request for reservation further includes a facility ID identifying said facility; and wherein said retrieving reservation schedule data step retrieves said reservation schedule data corresponding to said date designated by said user and said facility ID.

31. A reservation control method according to claim 30, wherein said retrieving reservation forbidden schedule data step retrieves said reservation forbidden schedule data corresponding to said date designated by said user and said facility ID if said date designated by said user corresponds to said time schedule in said reservation forbidden schedule data and said facility ID corresponds to a facility related to said time schedule in said reservation forbidden schedule data.

32. A reservation control computer program stored in a storage medium for reserving times for use of a plurality of facilities, said computer program when executed by a computer causes said computer to perform the steps of:

receiving a log-in request from a user of said facilities, said log-in request including a user ID;

permitting said user to enter a request for reservation of a facility if said user ID matches one of a plurality of user ID's included in user log-in data, said request for reservation including a date designated by said user;

retrieving reservation schedule data corresponding to said date designated by said user;

retrieving reservation forbidden schedule data corresponding to said date designated by said user if said date designated by said user corresponds to a time schedule in said reservation forbidden schedule data; and displaying said reservation schedule data and said reservation forbidden schedule data corresponding to said date designated by said user for viewing by said user when said date designated by said user corresponds to said time schedule of said reservation forbidden schedule data.

33. A reservation control computer program according to claim 32, wherein said request for reservation further includes a facility ID identifying said facility; and wherein said retrieving reservation schedule data step retrieves said reservation schedule data corresponding to said date designated by said user and said facility ID.

34. A reservation control computer program according to claim 33, wherein said retrieving reservation forbidden schedule data step retrieves said reservation forbidden schedule data corresponding to said date designated by said user and said facility ID if said date designated by said user corresponds to said time schedule in said reservation forbidden schedule data and said facility ID corresponds to a facility related to said time schedule in said reservation forbidden schedule data.

35. A reservation control computer program according to claim 32, wherein said displaying step comprises the step performed by said computer of:

displaying said reservation forbidden schedule data in a manner which distinguishes said reservation forbidden schedule data from said reservation schedule data.

36. A reservation control computer program according to claim 32, wherein said storage medium is included in a server connected to a network having a plurality of computers; and wherein said server transfers said reservation control computer program to said computer for execution, via said network.

37. A reservation control computer program according to claim 32, wherein said computer which executes said reservation control computer program is a server computer.

38. A reservation control computer program according to claim 32, wherein said computer which executes said reservation control computer program is a client computer.

39. A reservation control computer program stored in a storage medium for reserving times for use of a plurality of facilities, said reservation control computer program when executed by a computer causes said computer to perform the steps of:

receiving a log-in request from a user of said facilities, said log-in request including a user ID;

permitting said user to enter a request for reservation schedule of a facility if said user ID matches one of a plurality of user ID's included in user log-in data, said request for reservation including a date designated by said user;

retrieving reservation forbidden schedule data corresponding to said date designated by said user when said date designated by said user corresponds to a time schedule in said reservation forbidden schedule data;

outputting an error message indicating that said request for reservation can not be satisfied when said date designated by said user corresponds to said time schedule in said reservation forbidden schedule data;

retrieving reservation schedule data corresponding to said date designated by said user when said date designated by said user does not correspond to said time schedule in said reservation forbidden schedule data;

outputting an error message indicating that said request for reservation can not be satisfied when said date designated by said user corresponds to said time schedule of an approved reservation schedule in said reservation schedule data; and registering a reservation schedule corresponding to said request for reservation when said date designated by said user does not correspond to said time schedule of an approved reservation schedule in said reservation schedule data.

40. A reservation control computer program according to claim 39, wherein said request for reservation further includes a facility ID identifying said facility; and wherein said retrieving reservation schedule data step retrieves said reservation schedule data corresponding to said date designated by said user and said facility ID.

41. A reservation control computer program according to claim 40, wherein said retrieving reservation forbidden schedule data step retrieves said reservation forbidden schedule data corresponding to said date designated by said user and said facility ID if said date designated by said user corresponds to said time schedule in said reservation forbidden schedule data and said facility ID corresponds to a facility related to said time schedule in said reservation forbidden schedule data.

42. A reservation control computer program according to claim 39, wherein said storage medium is included in a server connected to a network having a plurality of computers; and wherein said server transfers said reservation control computer program to said computer for execution, via said network.

43. A reservation control computer program according to claim 39, wherein said computer which executes said reservation control computer program is a server computer.

44. A computer program according to claim 39, wherein said computer which executes said reservation control computer program is a client computer.

* * * * *